United States Patent [19]
Ludloff

[11] 3,723,849
[45] Mar. 27, 1973

[54] CIRCUIT ARRANGEMENT FOR CHARGING A STORAGE CAPACITOR

[75] Inventor: Wolfgang Ludloff, Porz-Westhoven, Germany

[73] Assignee: Multiblitz Dr. Ing. D. A. Mannesmann GmbH, & Co. KG., Porz-Westhoven, Germany

[22] Filed: May 4, 1972

[21] Appl. No.: 250,379

[30] Foreign Application Priority Data

May 14, 1971 Germany.................P 21 23 912.3

[52] U.S. Cl.................321/18, 307/252 T, 315/223, 315/232, 321/24, 323/24
[51] Int. Cl..............................................H02m 7/20
[58] Field of Search............320/1; 321/18, 24, 45 C; 315/194, 219, 223, 229, 232, 233, 308, 311, 100 S; 307/252 T, 297; 323/22 SC, 24, 25

[56] References Cited

UNITED STATES PATENTS 3,490,030  1/1970  Kelley, Jr.......................323/24 SC
3,643,405  2/1972  Vukasovic et al. ............323/22 SC

FOREIGN PATENTS OR APPLICATIONS 895,529  3/1972  Canada..........................323/22 SC Primary Examiner—Gerald Goldberg
Attorney—Howard H. Darbo et al.

[57] ABSTRACT

A first pair of antiparallel connected thyristors are connected in series with the a.c. input and the primary of a transformer. These thyristors are ignited respectively at the start of each half cycle. A rectifier is connected across the transformer secondary and across the storage capacitor to be charged. An auxiliary capacitor in series with a resistor are connected across the a.c. input. A second pair of antiparallel thyristors have an ignition device. The latter ignition device is controlled by a voltage derived from a voltage divider across the storage capacitor and ignite the second pair of thyristors some time after the start of successive half cycles. When ignited the respective second thyristor applies the voltage of the auxiliary capacitor across the first pair of thyristors in opposition to the a.c. voltage thereacross to turn off the ignited thyristor of the first pair.

8 Claims, 1 Drawing Figure

PATENTED MAR 27 1973 3,723,849
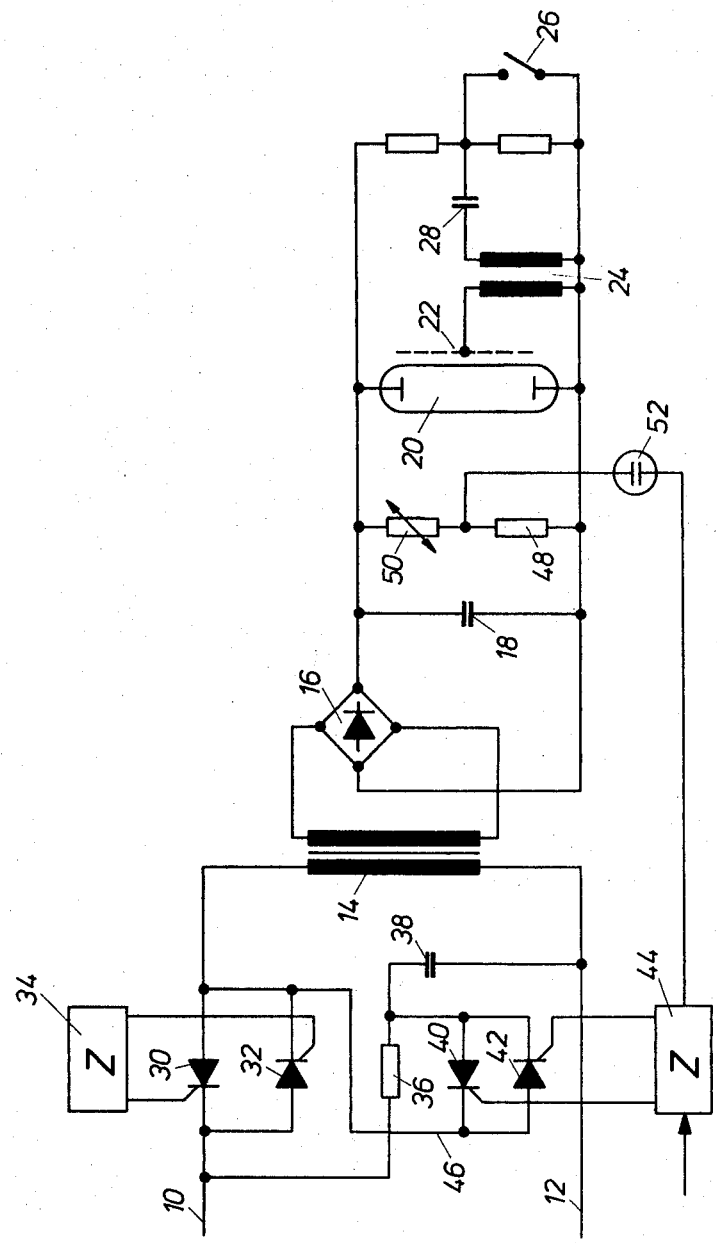

CIRCUIT ARRANGEMENT FOR CHARGING A STORAGE CAPACITOR

BACKGROUND AND SUMMARY OF THE INVENTION

This invention relates to a circuit arrangement for charging a storage capacitor to an adjustable voltage by means of a rectified a.c. voltage. Circuit arrangements of the type indicated can, for instance, be used in order to charge a storage capacitor for a flash unit to an adjustable voltage, the storage capacitor discharging via an electron flash tube as individual flash or as stroboscopic flashes.

It is prior art to charge the storage capacitor via a thyristor circuit, the control of the voltage being effected by a firing angle control (phase control). In such prior art circuit arrangements the firing angle control must take place during the decreasing quarter-period of each half-wave, since were the firing angle control operative in the increasing part of the half-wave, the capacitor voltage would rise via the rectifier to the maximum value of the a.c. voltage at any event. Upon ignition of the thyristor, the voltage must then rise very rapidly to the instantaneous value of the applied a.c. voltage. Thus, the a.c. voltage is practically applied in short-circuit across the empty capacitor via the thyristor. Thereby, a high current pulse is obtained which loads the construction elements accordingly. A further disadvantage is that the point of ignition is connected according to a sine function with the desired voltage value so that means must be provided in order to vary the point of ignition according to an inverse sine function of the desired capacitor voltage.

It is an object of this invention to so design a circuit arrangement for charging a storage capacitor so that no undesired high current pulses occur and the adjustment of the desired capacitor voltage can be effected in a simple manner. According to the invention, this object is attained by providing that a first pair of antiparallelly connected thyristors are connected in the a.c. circuit which thyristors are ignited by a first ignition circuit during the zero passages of the alternating current, that a capacitor is charged by the a.c. voltage in each half-wave via a charging resistor, and that a second pair of antiparallelly connected thyristors are provided which are ignited by a second ignition circuit and via which the capacitor voltage is applied across the thyristors of the first pair in opposition to the a.c. voltage thereacross.

In contrast to a firing angle control the thyristors of the first pair are ignited at the beginning of each half-wave. Now a gradual charge of the capacitor in response to the voltage increasing in this half-wave takes place. Thus, the capacitor need not be charged suddenly to the instantaneous value of the a.c. voltage. If the instantaneous value of the a.c. voltage and therewith the voltage of the storage capacitor has reached the desired value, the respectively ignited thyristor of the first pair will be quenched by means of a thyristor of the second pair applying the capacitor voltage of the auxiliary capacitor across the thyristor of the first pair in opposition to the a.c. voltage thereacross. As the auxiliary capacitor is also charged substantially to the instantaneous value of the a.c. voltage, in this manner the voltage drop across the ignited thyristor of the first pair becomes zero, so that this thyristor is quenched. Therewith the charge of the storage capacitor is terminated.

The invention offers the possibility of controlling the second ignition circuit by the voltage across the storage capacitor. Since the storage capacitor is charged until a given desired value is reached and then the charging is interrupted from this value via the second ignition circuit, it is not necessary to convert the voltage setpoint value according to an inverse sine function to a phase shift for the ignition pulse.

The invention can be realized in such a manner that an adjustable voltage divider is connected in parallel to the storage capacitor and the partial voltage picked off across the voltage divider controls the ignition circuit for the second (or quenching) pair of thyristors via a circuit element having a threshold value, such as a glow lamp.

It is furthermore advantageous if the a.c. voltage is connected to a rectifier bridge via a transformer, and the pairs of thyristors are provided on the primary side of the transformer.

DESCRIPTION OF THE DRAWING

The drawing schematically shows a circuit diagram of an arrangement according to the invention.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

An a.c. voltage is applied to input connections 10, 12. To the extent that the a.c. voltage is applied to the primary of transformer 14, the transformer secondary applies it to a rectifier bridge 16. A storage capacitor 18 is connected to the output of the rectifier bridge 16. A flash tube 20 is ignited in a conventional manner by voltage from an ignition transformer 24 applied to an ignition electrode 22. Upon closing of a contact 26 (or a corresponding electronic arrangement) the ignition transformer 24 receives a pulse from an ignition capacitor 28 causing an ignition pulse across the ignition electrode 22. The storage capacitor 18 then is discharged across the flash tube 20.

In the a.c. circuit on the primary side of transformer 14 are connected a first pair of antiparallelly connected thyristors 30, 32. These are ignited by an ignition device 34 of known type at the beginning of each half-period of the a.c. voltage, one being ignited during one half-wave and the other being ignited during the succeeding half-wave. Moreover, an auxiliary capacitor 38 is charged by the a.c. voltage via a relatively small charging resistor 36. The voltage across the auxiliary capacitor 38 substantially follows the applied a.c. voltage. Reference numerals 40 and 42 designate a second pair of antiparallelly connected thyristors which are controlled by an ignition device 44. Upon ignition of one of these thyristors of which, of course, only one ignites during each half-wave, the voltage of the capacitor 38 is connected "behind" the thyristors 30, 32 via a line 46, so that it is connected across the first pair of thyristors 30, 32 in opposition to the applied a.c. voltage. Therewith, the voltage applied to the thyristors 30, 32 disappears, since the capacitor 38 is charged to the instantaneous value of the applied a.c. voltage for all practical purposes. The thyristors 30 and 32 therefore quench so that the current flux in the circuit of the transformer primary ceases. Thereupon, the further charging of the storage capacitor 18 is interrupted.

A voltage divider comprising a fixed resistor 48 and an adjustable resistor 50 is connected in parallel with the storage capacitor 18. A partial voltage of the voltage applied to the capacitor 18 is picked off across the voltage divider 48, 50. This partial voltage controls the ignition circuit 44 via a glow lamp 52 (i.e. a gas filled lamp having a voltage threshold at which it will commence conducting current). The picked-off partial voltage across the voltage divider 48, 50 is compared with the fixed threshold value of the glow lamp 52. By adjustment of the resistor 50 the voltage value across the capacitor 18 can be varied within wide limits, at which the glow lamp 52 ignites and in turn ignites the thyristors 40, 42 via the ignition circuit 44 and causes the thyristors 30, 32 to be quenched. Thus, the thyristors 30, 32 are connected in the meaning of a regulation by the voltage actually applied across the capacitor 18.

Thus, it is possible to charge the capacitor to an adjustable desired voltage, either once during each half-wave, for instance for a stroboscopic flash illumination, or integratingly over a plurality of half-waves for individual flash release. If, in the latter case, the voltage of the storage capacitor 18 approximates the set-point value, the quenching point for each half-wave via the control unit 44 is moved increasingly farther towards the beginning of each half-wave, so that finally, the further charging is interrupted.

I claim:

1. In an apparatus for charging a storage capacitor from alternating current provided at a.c. input connections, comprising a rectifier, first means connecting said connections to said rectifier, and second means connecting said rectifier to said capacitor, the improvement comprising:

said first means including a first pair of antiparallel connected thyristors in series between said connections, a first ignition device connected to said thyristors to ignite them respectively at about the start of each half cycle of the alternating current, an auxiliary capacitor and a resistor connected in series between said connections so that the auxiliary capacitor is charged by the a.c. voltage during each half cycle, a second pair of antiparallel connected thyristors, a second ignition device connected to said second pair of thyristors to ignite them respectively, and means connecting said capacitor and said second pair of thyristors across the first pair of thyristors in opposition to the a.c. voltage across the first pair of thyristors so upon ignition of one of the second pair of thyristors the capacitor is applied across the first pair of thyristors to shut off the same.

2. In an apparatus as set forth in claim 1 including means connecting the storage capacitor to the second ignition device for controlling the operation of the second ignition device in response to the charge in the storage capacitor.

3. In an apparatus as set forth in claim 2, wherein said last mentioned means includes an adjustable voltage divider connected in parallel to the storage capacitor, said voltage divider having a voltage pick-off connection, and including threshold means connecting said pick-off connection and said second device.

4. In an apparatus as set forth in claim 3, wherein said threshold means is a glow lamp.

5. In an apparatus as set forth in claim 4, wherein said first means includes a transformer having a primary and a secondary, said rectifier being a bridge rectifier connected across said secondary, said first pair of thyristors being in series with said primary.

6. In an apparatus as set forth in claim 1, wherein said first means includes a transformer having a primary and a secondary, said rectifier being a bridge rectifier connected across said secondary, said first pair of thyristors being in series with said primary.

7. In an apparatus as set forth in claim 2, wherein said first means includes a transformer having a primary and a secondary, said rectifier being a bridge rectifier connected across said secondary, said first pair of thyristors being in series with said primary.

8. In an apparatus as set forth in claim 3, wherein said first means includes a transformer having a primary and a secondary, said rectifier being a bridge rectifier connected across said secondary, said first pair of thyristors being in series with said primary.

* * * * *